United States Patent [19]

Bassett

[11] 4,447,980

[45] May 15, 1984

[54] SPINNER FOR FISHING LURE, AND FISHING LURE HAVING SPINNER MOUNTED THEREON

[76] Inventor: Ronald M. Bassett, 2107 Summerdale, Chicago, Ill. 60625

[21] Appl. No.: 369,930

[22] Filed: Apr. 19, 1982

[51] Int. Cl.³ .................................................. A01K 85/00
[52] U.S. Cl. ..................................... 43/42.14; 43/42.2
[58] Field of Search .................. 43/42.19, 42.2, 42.14, 43/42.17, 42.46, 42.53; D22/27

[56] References Cited

U.S. PATENT DOCUMENTS

| | | | |
|---|---|---|---|
| D. 205,774 | 9/1966 | Schneider | D22/27 |
| D. 257,382 | 10/1980 | Williams | D22/27 |
| 1,986,738 | 1/1935 | Mitchell | 43/42.17 X |
| 2,153,489 | 4/1939 | Whitis | 43/42.14 X |
| 2,265,482 | 12/1941 | Hearn | 43/42.17 X |
| 2,497,807 | 2/1950 | Wood | 43/42.2 |
| 2,711,049 | 6/1955 | Quyle | 43/42.2 |
| 2,722,079 | 11/1955 | Johnson | 43/42.14 |
| 3,104,486 | 9/1963 | Gressard | 43/42.17 |
| 3,397,478 | 8/1968 | Lowes | 43/42.14 |
| 3,405,474 | 10/1968 | Lewis | 43/42.14 X |
| 4,110,930 | 9/1978 | Daniels | 43/42.14 |

FOREIGN PATENT DOCUMENTS 1109727 2/1956 France ............................ 43/42.2

Primary Examiner—Nicholas P. Godici
Assistant Examiner—P. Weston Musselman, Jr.
Attorney, Agent, or Firm—Samuel Kurlandsky

[57] ABSTRACT

A fishing lure comprising a shaft, means at one end of the shaft for affixing a line thereto, body member connected to the other end of the shaft, hook means connected to the body member, and a spinner rotatably mounted on the shaft, the spinner comprising a blank or strip of flat material formed into a cylindrical body portion, the axis of the imaginary cylinder of which the spinner is a peripheral portion being disposed at an acute angle with respect to the longitudinal center line of the spinner. In the preferred form a bearing member having an aperture therethrough is affixed to a central portion of the spinner with the aperture of the bearing member being superposed over an aperture provided in the blank, the axis of the aperture being disposed at an acute angle with respect to the center line of the spinner and adapted to be journalled over the shaft.

14 Claims, 8 Drawing Figures

SPINNER FOR FISHING LURE, AND FISHING LURE HAVING SPINNER MOUNTED THEREON

BACKGROUND OF THE INVENTION

1. Field of the Invention

The present invention relates to artificial fishing lures, and more particularly refers to a fishing lure having a novel spinner.

2. Description of the Prior Art

The history of the development of the fishing lure art is exemplified by a perennial struggle to develop a fishing lure which is more attractive to fish than to fisherman. Countless lures have been developed in the hope that they will provide an action when towed in the water calculated to delude a fish into mistaking the action of the lure for the motion of live bait. Many lures have been developed having a spinner to develop movement calculated to fool the fish. There are generally two basic types of spinners applied to lures. The most popular has been one with an elliptical outline having a dished cross-section similar in shape to that of a teaspoon. The lure is generally provided with an aperture at one end by means of which the spinners are mounted on a shaft by means of a clevis, causing them to rotate axially about the shaft.

Another form of spinner is the propeller. The propeller may vary in configuration, but normally is of symmetrical shape with two blades diametrically opposed to each other having a central bearing for rotation about an axis, with its central line substantially perpendicular to the axis on which it is mounted.

It has been the considered consensus of accomplished fishermen that fish eventually learn to recognize artificial lures if the same lures are consistently used. Consequently, those skilled in the art have striven to develop a lure which is novel to fish.

SUMMARY OF THE INVENTION

It is accordingly an object of the present invention to provide a fishing lure which will attract fish.

It is a further object to provide a fishing lure having means for providing novel motion of the lure when it is towed through the water, which motion is attractive to a lurking fish and is in fact different from that of present lures.

It is still further an object of the invention to provide a fishing lure of the type described which can be readily and inexpensively manufactured.

Other objects and advantages of the invention will become apparent upon reference to the drawings and details of the description.

According to the invention a fishing lure is provided comprising a shaft, means at one end of the shaft for affixing a line thereto, a body member connected to the other end of the shaft, a hook connected to the body member and a spinner rotatably mounted on the shaft. The spinner is formed from an elongate strip of metal by providing an arcuate cross-section, and twisting the ends so that they are oppositely disposed with respect to each other. In a preferred form the spinner is produced by forming the blank over the surface of a cylindrical body and so positioned that the longitudinal center line of the blank is disposed at an acute angle with respect to the axis of the cylindrical body. A bearing member is then affixed at the central portion of the spinner in an offset position so that the longitudinal central line of the spinner is disposed at an acute angle with respect to the bearing shaft on which it is mounted.

DESCRIPTION OF THE PREFERRED EMBODIMENTS

Figure 1:
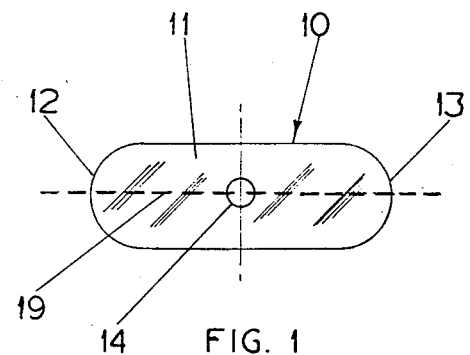
FIG. 1 is a plan view of a flat elongate blank used to form the spinner of the present invention.
Figure 2:
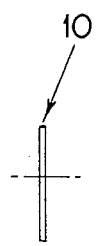
FIG. 2 is an end view of the blank shown in FIG. 1.

Referring to FIGS. 1 and 2, an elongate blank 10 formed of a flat strip of metal is shown for forming the spinner of the present invention. The blank comprises a flat plate 11 having round ends 12 and 13, and a centrally located aperture 14. The blank may be formed of any non-corrosive material such as a metal, and preferably stainless steel.

Figure 3:
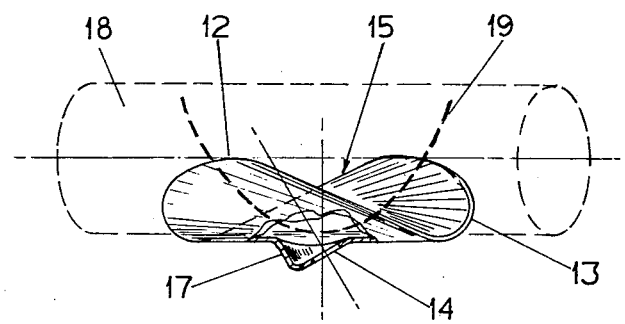
FIG. 3 is a side view of the blank formed about the surface of a cylinder shown in broken lines, and having an offset central portion with an aperture for receiving a bearing member.
Figure 4:
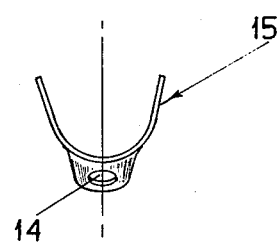
FIG. 4 is an end view of the structure shown in FIG. 3 with the forming cylinder removed.
Figure 5:
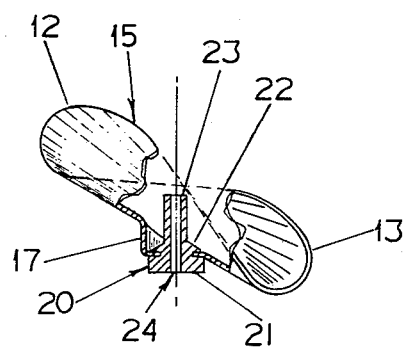
FIG. 5 illustrates the spinner having a bearing member mounted therein.
Figure 6:
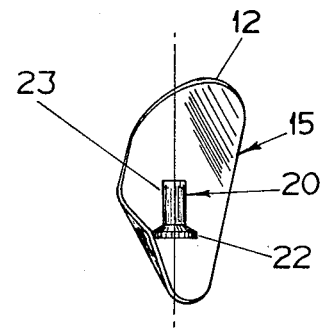
FIG. 6 is an end view of the structure shown in FIG. 5.

Referring to FIGS. 3 and 4 the blank 10 is shown formed into a spinner 15 having oppositely twisted ends and having an offset portion 17 adapted to receive a bearing member 20 (shown in FIGS. 5 and 6). As shown in FIG. 3, a cylinder 18, shown in broken lines, is utilized to form the spinner 15. In placing the blank 10 over the cylinder 18, as shown in FIG. 3, the blank is so positioned that its central longitudinal line, shown as a broken line 19 is disposed at an acute angle with respect to the axis of the cylinder 18.

Referring to FIGS. 5 and 6, the formed spinner 15 is shown having a bearing member 20 inserted in the aperture 14. The bearing member 20 is comprised of a base 21, an aperture engaging collar 22 and a reduced end 23. An axial aperture 24 is provided for being journalled over the shaft of the fishing lure.

Figure 7:
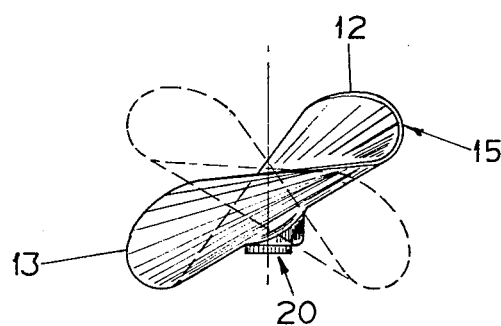
FIG. 7 is a side view showing the other side of the structure shown in FIG. 5.

Referring to FIG. 7, the spinner is shown in two rotative positions, one position shown in phantom or broken lines. This view is also indicative of the butterfly-type pattern which the spinner engages in as it is rotated through the water.

Figure 8:
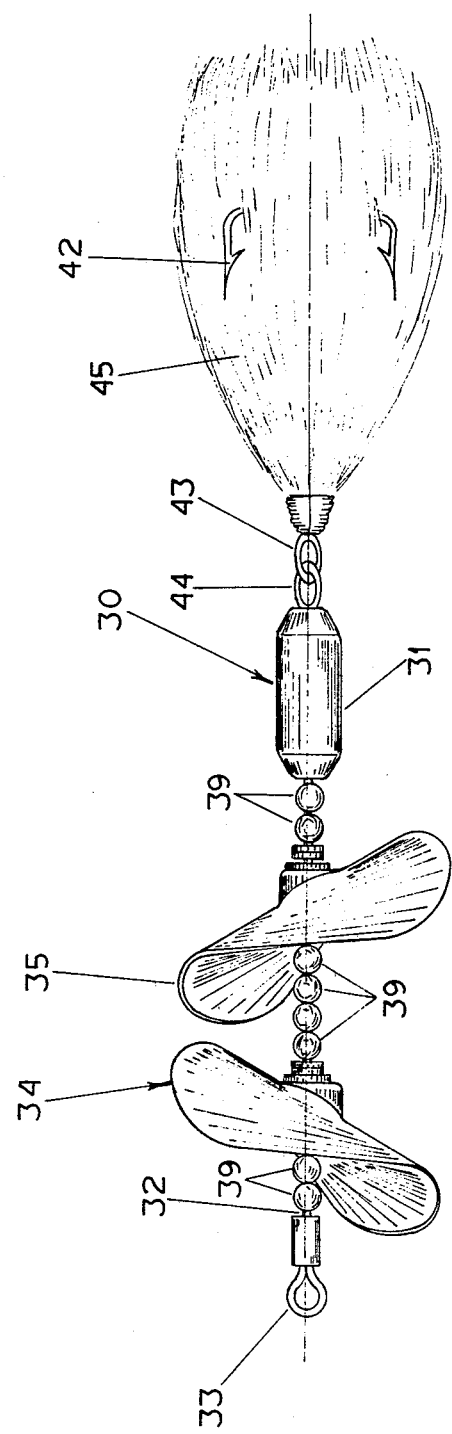
FIG. 8 is a side view of a complete lure having a pair of spinners according to the invention.

Referring to FIG. 8 a complete fishing lure 30 is shown having a body 31. A shaft 32 is affixed at one end of the body 31 and provided with a loop 33 at its end adapted for having a line affixed thereto. A pair of spinners 34 and 35, according to the invention, have their bearings journalled over the shaft 32 for rotation thereover. As seen, the spinners are mounted so that they are disposed at an acute angle with respect to the shaft 32. Further, the concave surfaces 36 and 37 of the spinners are disposed toward the direction in which the lure will be drawn in order that the movement relative to the water will have a greater effect in rotating the spinners.

A plurality of beads 39 are mounted over the shaft 32 for spacing the spinners from each other and from other portions of the lure. A triple hook 42 is mounted on the body 31 by means of attachment rings 43 and 44. A buck-tail 45 is mounted over the hook 42 in conventional manner.

The spinner of the present invention may be very simply and inexpensively fabricated. First a blank is stamped out of sheet metal which is preferably non-corrosive. The blank is elongated and has rounded tips and a centrally located hole for mounting. Although the spinner may be formed by twisting the ends of the blank, a preferred method is to place the blank over a rod or cylinder with its longitudinal center line disposed at an acute angle with respect to the axis of the rod or cylinder. The curved tips are then formed as curved pitch blades having a concave surface and a convex surface. The blades are pitched in opposite relationship to each other. At the same time the center hole 14 is deformed downwardly or offset to form an offset portion 17 in the form of a dished pocket to provide an angular mounting pocket. The bearing 20 is then inserted in the aperture 14 and the edges of the hole are engaged between the base 21 and the aperture-engaging collar 22.

In forming the spinner, it may be formed in either a right hand or left hand orientation by changing the relative positioning of the blank 10 and the cylinder 18 on which it is formed. Curvature forming is obtained by placing the blank over the cylindrical forming block with the longitudinal center line of the blank disposed at an acute angle with respect to the axis of the formed block. This puts the highest proportion of the blade area and curvature to one side of the center line to provide a curved surface which will provide rotation. By placing the blade in the opposite direction of the axis of the cylinder the pitch will be reversed, causing the spinner to rotate in the opposite direction. Either clockwise or counter clockwise rotating spinners can be formed on the same cylindrical tool by the use of an interchangeable locating device. The blank is formed by the use of a forming tool having an internal surface complementary to the cylindrical surface of the forming cylinder. As shown in FIG. 8, two spinners may be utilized on the lure, each rotating in a different direction. Alternatively, only a single spinner may be utilized.

The fishing lure utilizing the novel spinner of the present invention has a number of advantages over prior art lures. Since the spinner has a large area and is lightweight, the lure can be retrieved through the water at a much slower speed for more efficient casting or trolling. The angular construction of the spinner will cause it to rotate through a large volume of water and produces a large reflective surface area with the highly attractive butterfly configuration that is attractive to fish.

It is to be understood that the invention is not to be limited to the exact details of construction or operation or materials shown and described as obvious modifications and equivalents will be apparent to one skilled in the art.

Invention is claimed as follows:

1. A fishing lure comprising a body member, a shaft having one end connected to said body member and the other end having means for affixing a line thereto, hook means secured to said body member and a spinner rotatably mounted on said shaft, said spinner comprising an elongate strip of material having a single concave surface and a single convex surface with the ends of said strip twisted oppositely with respect to each other, and a bearing member centrally mounted on said elongate strip having an elongate aperture of cylindrical surface rotatably journalled over said shaft, the axis of said aperture being disposed at an acute angle with respect to and substantially intersecting the longitudinal center line of said elongate strip, whereby one end of said spinner is disposed in a forward direction with respect to said lure and the other end of said spinner is disposed in a rearward direction thereto.

2. A fishing lure according to claim 1, wherein said spinner is formed about a cylindrical surface, the longitudinal central line of said spinner being disposed at an acute angle with respect to the axis of the cylindrical surface on which it is formed.

3. A fishing lure according to claim 1, wherein the concave surface of said spinner is disposed toward the front portion of said lure.

4. A fishing lure according to claim 1, wherein said spinner is formed of stainless steel.

5. A fishing lure according to claim 1, wherein said hook means has a buck-tail disposed thereover.

6. A fishing lure according to claim 1, wherein the ends of said spinner are arcuate.

7. A fishing lure according to claim 1, wherein said shaft has a pair of spinners mounted thereon arranged to rotate in opposite directions.

8. A fishing lure according to claim 1, wherein an eyelet is provided at the forward end of said shaft.

9. A fishing lure according to claim 1, wherein beads are mounted over said shaft on both sides of said spinner.

10. A spinner adapted for being rotatably mounted on the shaft of a fishing lure, said spinner comprising an elongate strip of material having a single concave surface and a single convex surface with the ends of said strip twisted oppositely with respect to each other, and a bearing member centrally mounted on said elongate strip having an elongate aperture of cylindrical surface adapted to be rotatably journalled over said shaft, the axis of said aperture being disposed at an acute angle with respect to and substantially intersecting the longitudinal center line of said elongate strip, whereby one end of said spinner is adapted to be disposed in a forward direction with respect to said lure and the other end of said spinner is adapted to be disposed in a rearward direction thereto.

11. A spinner according to claim 10, wherein said spinner is formed about a cylindrical surface, the longitudinal central line of said spinner being disposed at an acute angle with respect to the axis of the cylindrical surface on which it is formed.

12. A spinner according to claim 10, wherein the concave surface of said spinner is adapted to be disposed toward the front portion of said lure.

13. A spinner according to claim 10, wherein said spinner is formed of stainless steel.

14. A spinner according to claim 10, wherein the ends of said spinner are arcuate.

* * * * *